(12) United States Patent
Kang et al.

(10) Patent No.: US 9,194,165 B2
(45) Date of Patent: Nov. 24, 2015

(54) BALL HINGE STRUCTURE

(75) Inventors: Gi Dong Kang, Gyeonggi-do (KR); Hak Ho Kim, Seoul (KR); Young Seon Seo, Gyeonggi-do (KR); Ho Sung Seo, Seoul (KR)

(73) Assignee: S-MOON CORPORATION, Gyeonggi-do (KR)

( * ) Notice: Subject to any disclaimer, the term of this patent is extended or adjusted under 35 U.S.C. 154(b) by 0 days.

(21) Appl. No.: 14/131,636

(22) PCT Filed: Jul. 6, 2012

(86) PCT No.: PCT/KR2012/005364
§ 371 (c)(1),
(2), (4) Date: Jan. 8, 2014

(87) PCT Pub. No.: WO2013/009041
PCT Pub. Date: Jan. 17, 2013

(65) Prior Publication Data
US 2014/0165331 A1    Jun. 19, 2014

(30) Foreign Application Priority Data

Jul. 8, 2011 (KR) ........................ 10-2011-0068115

(51) Int. Cl.
*E05D 11/04* (2006.01)
*F16C 11/08* (2006.01)
*F16C 11/06* (2006.01)

(52) U.S. Cl.
CPC ............ *E05D 11/04* (2013.01); *F16C 11/0652* (2013.01); *F16C 11/08* (2013.01); *Y10T 16/524* (2015.01)

(58) Field of Classification Search
CPC .......... E05D 7/06; E05D 11/04; F16M 11/14; F16C 11/06; F16C 11/0623; F16C 11/0647; F16C 11/08; F16C 11/0652; Y10T 16/524
USPC ............ 16/224; 403/125, 132, 133, 135–138, 403/144, 146; 248/288.31
See application file for complete search history.

(56) References Cited

U.S. PATENT DOCUMENTS

| | | | | |
|---|---|---|---|---|
| 3,350,121 A | * | 10/1967 | Townsend | 403/131 |
| 3,951,557 A | * | 4/1976 | Herbenar | 403/138 |
| 4,063,834 A | * | 12/1977 | Hanson et al. | 403/138 |
| 4,087,188 A | * | 5/1978 | McEowen | 403/138 |
| 4,102,585 A | * | 7/1978 | Herbenar | 403/138 |
| 4,134,701 A | * | 1/1979 | McEowen | 403/34 |
| 5,022,779 A | * | 6/1991 | Schnitzler | 403/138 |
| 5,066,160 A | * | 11/1991 | Wood | 403/140 |
| 5,772,352 A | * | 6/1998 | Fukumoto et al. | 403/144 |
| 6,010,271 A | * | 1/2000 | Jackson et al. | 403/131 |

(Continued)

*Primary Examiner* — William Miller
(74) *Attorney, Agent, or Firm* — IP & T Group LLP

(57) ABSTRACT

Provided is a ball hinge structure in which a ball hinge can be freely rotated in various directions and maintain a fixed state. The ball hinge structure includes a ball hinge rotatably installed in a hinge housing; and a first hinge resistor and a second hinge resistor elastically supported with respect to each other by a second spring, wherein the second hinge resistor is closely attached to a circumference at a side of a sphere of the ball hinge, the first hinge resistor is elastically supported by a first spring provided on a top surface of a hinge housing cap coupled to a lower portion of the hinge housing, and a groove is formed in the bottom of the ball hinge, and thus the first hinge resistor is lifted in a position as high as the height of the groove.

7 Claims, 7 Drawing Sheets

(56) References Cited

U.S. PATENT DOCUMENTS 6,533,491 B1 * 3/2003 Redele .......................... 403/138
7,219,867 B2 * 5/2007 Kalis et al. ............... 248/288.31
7,296,771 B2 * 11/2007 Kalis et al. ............... 248/288.31

* cited by examiner

BALL HINGE STRUCTURE

This application is a national stage application of PCT/KR2012/005364 filed on Jul. 6, 2012, which claims priority of Korean patent application number 10-2011-0068115 filed on Jul. 8, 2011. The disclosure of each of the foregoing applications is incorporated herein by reference in its entirety.

TECHNICAL FIELD

The present invention relates, in general, to a ball hinge structure and, more particularly, to a ball hinge structure in which a ball hinge can be freely rotated in various directions and can maintain a fixed state.

BACKGROUND ART

Today, various portable devices have been developed and are widely used. Of these portable devices, a cellular phone, an MP3 player, a PMP (portable multimedia player), a laptop computer, a netbook computer, a smart phone, a tablet PC and the like are popularly used. Generally, when users of these portable devices go outdoors, they carry their portable devices, or when the users come indoors, they place their portable devices on a desk or table.

These portable devices enable users to enjoy multimedia information in a state of conveniently holding the device with their hands or to simply perform his or her work by driving other programs, and can be used even when users are walking or are riding on a bus or subway.

However, with the development of the iPad as a starting point, tablet PCs have been recently developed, and thus, a user can conveniently use his or her portable device while carrying it outdoors, thereby enabling the user to easily search for information or listen to music in a bus or subway.

The frequency in use of these portable devices indoors as well as outdoors has been continuously increasing, and in order to conveniently use them indoors, a separate holder has been used so that a user can enjoy multimedia contents with his or her portable device placed on a horizontal plane such as a desk and the like.

Although a conventional holder is configured so that the user can enjoy various kinds of multimedia contents in a car or in a state of his or her portable device being placed on a desk without holding it in his or her hand, it is difficult for the holder composed in a single stage form to change and fix holding positions of the device as the user wishes, and there is also inconvenience in that the step of fixing the holder to a desired position should be performed.

In order to eliminate the fixing step, a ball hinge has been developed as a solution. The ball hinge is compressed by an elastic force, but there is the inconvenience that the user should apply much force to the holder in order to change the position thereof when the holder is provided with the elastic force of a spring so as to endure the load of a product such as the iPad.

Although the hinge structure connected to the holder and fixed to be compressed by the elastic force can be freely rotated or can be horizontally and vertically moved freely, the hinge structure endures the load of a product such as an iPad in a vertical state, but a fixed state thereof can be easily released in a slanted state because the hinge structure is supported by only the elastic force.

DISCLOSURE

Technical Problem

Accordingly, the present invention has been made keeping in mind the above problems occurring in the prior art, and an object of the present invention is to provide a ball hinge structure which is configured such that due to a first spring and a second spring, a force acting from each of the springs is changed according to a position, and thus when a ball hinge is in an erected state, a second hinge resistor functioning to fix a position of the ball hinge holds the ball hinge only to a degree that the position of the ball hinge does not slip, and a first spring having a strong elastic force acts a strong force when the ball hinge is tilted by being rotated.

The ball hinge structure is also configured such that when the strong elastic force acts from the first spring, the second spring stretches so that the elastic force acting on the ball hinge can be reduced by the second hinge resistor, thereby enabling the ball hinge to be easily movable.

That is, the ball hinge structure is configured such that the second hinge resistor is closely attached to a sphere of the ball hinge so as to prevent the ball hinge from being moved thanks to friction, and the ball hinge is fixed not to slip in a state of receiving a relatively small force from a first hinge resistor by providing the highest frictional force in an initial vertical state.

Another object of the present invention is to provide a ball hinge structure having a bellows configured to prevent the ball hinge from not operating properly because pollutants such as water, oil, and dust have entered a gap between the ball hinge and the hinge housing.

Technical Solution

In order to accomplish the above objects, the present invention provides a ball hinge structure, including: a ball hinge 20 rotatably installed inside a hinge housing 10; a first hinge resistor 50 and a second hinge resistor 30 elastically supported with respect to each other by a second spring 40, wherein the second hinge resistor 30 is closely attached to a circumference at a side of a sphere 21 of the ball hinge 20, the first hinge resistor 50 is elastically supported by a first spring 60 provided on a top surface of a hinge housing cap 70 coupled to a lower portion of the hinge housing 10, a groove 23 is formed in the bottom of the ball hinge 20, and thus, when the ball hinge is maintained in a normal position thereof, the first hinge resistor 50 is lifted in a position as high as the height of the groove 23 in a globular shape, and as a result, the ball hinge 20 applies a weak compression force to the first spring 60 elastically supporting the first hinge resistor 50, and when the ball hinge 20 is tilted, the sphere 21 outside the groove 23 pushes the first hinge resistor 50 according to a tilted angle thereof, thereby applying a strong compression force to the first spring 60, a compression force opposite to the compression force of the first hinge resistor 50 is applied to the second hinge resistor 30, so a fixing force of the ball hinge can be changed according to the position of the ball hinge, a protrusion 15 is formed in an arc portion 14 of the hinge housing 10 so that the sphere 21 of the ball hinge 20 can be easily rotated, the center of a top surface 53 of the first hinge resistor 50 has a gentle arc shape, and an edge of the top surface 53 has the same curvature as that of the sphere 21 of the ball hinge 20, so, when the groove 23 formed in the bottom of the sphere 21 is placed on the top surface 53 with a connecting rod 22 of the ball hinge 20 positioned vertically relative to the top surface 53, the first hinge resister 50 is located at the uppermost position, and when the connecting rod 22 is positioned horizontally relative to the top surface 53, the first hinge resistor 50 is located at the lowermost position so that the compression force acting on the first spring 60 can be changed, a groove 54 is formed in a circumference of the first hinge resistor 50 so that a lower part of the second spring 40 that is a compression spring can be inserted, and a groove 32 is entirely formed along the bottom of a ring-shaped body 31 of the second hinge resistor 30 so that an upper part of the second spring 40 can be inserted into the groove 32, an urethane contact portion 33 is formed in an upper portion of the of the second hinge resistor 30 so as to come into close contact with the sphere 21 of the ball hinge 20, and a support 52 protrudes in a cylindrical shape in the center of the bottom of the first hinge resistor 50 and is supported to be vertically movable through a hole 72 formed in the center of the hinge housing cap 70. Furthermore, the ball hinge structure is also characterized in that a bellows 80 is installed to entirely cover both a side of a connecting rod 22 of the ball hinge 20 and an outer surface of the hinge housing 10.

Advantageous Effects

According to the present invention, it is advantageous in that it is convenient for a ball hinge structure to be used because fixed structures above and below are moved by a ball hinge such as a holder without the need to perform a series of operations for the fixing and releasing of a position, and a fixed state is maintained when the structures are left in a position they have been moved to by a user.

Also, it is advantageous in that a fixed state can be easily maintained in a state of the ball hinge being tilted because a higher elastic force acts in the tilted state than that in a vertical state.

It is advantageous in that a bellows is fixed between a connecting rod of the ball hinge and an outer surface of the hinge housing so as to prevent pollutants such as water, oil, dust, and the like from entering the hinge structure, preventing the ball hinge from malfunctioning and enabling the ball hinge to be normally used for a long time.

MODE FOR INVENTION

Figure 1:
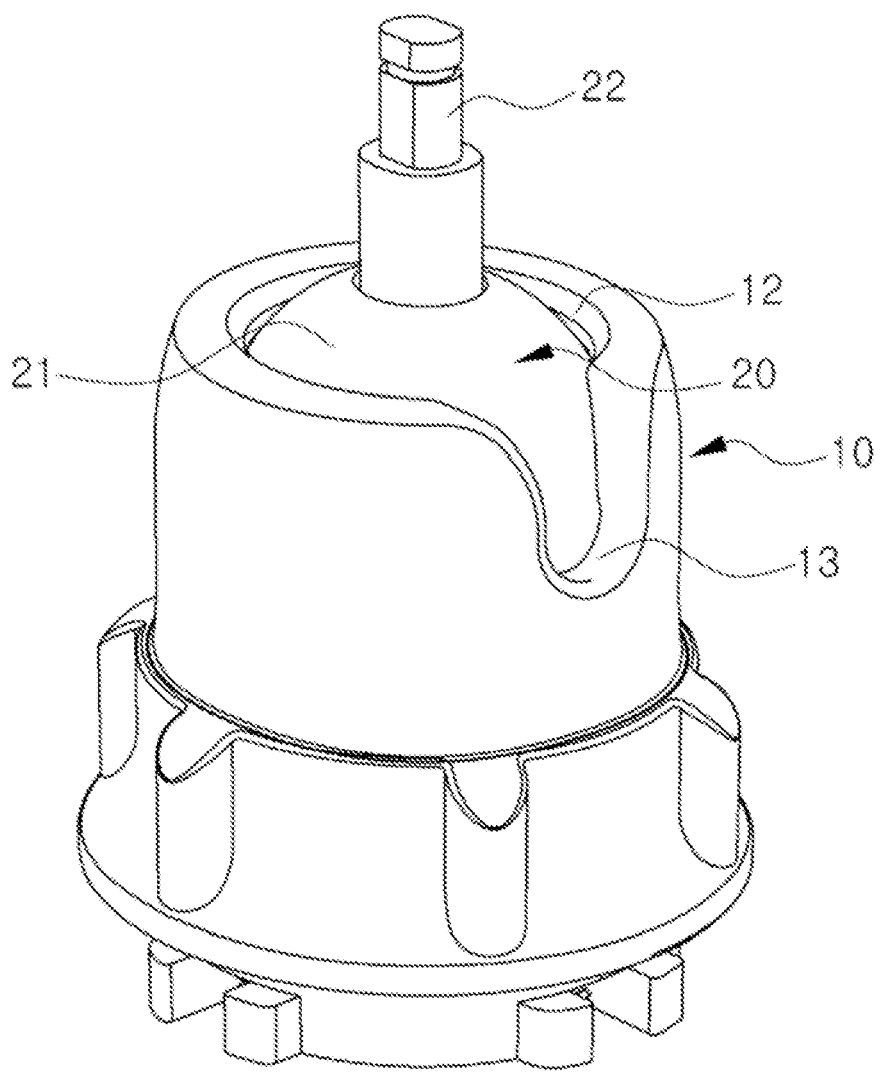
FIG. 1 is a perspective view illustrating a ball hinge structure of the present invention.
Figure 2:
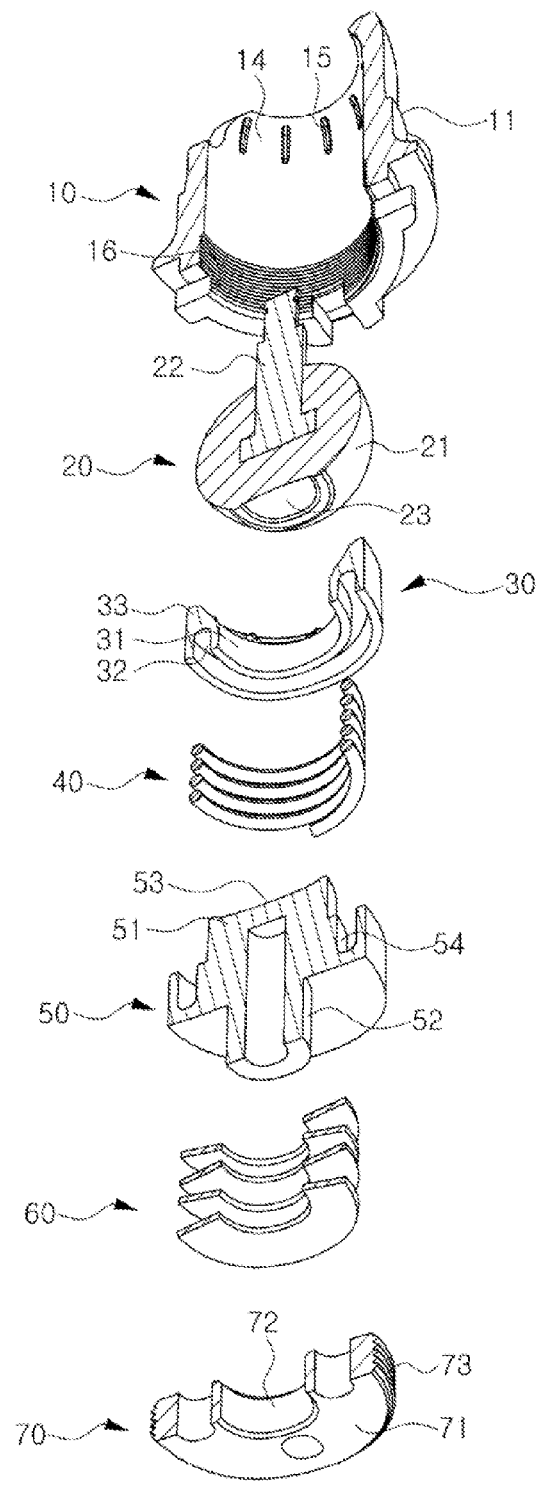
FIG. 2 is an exploded perspective view showing a cross section of the ball hinge structure of the present invention.
Figure 3:
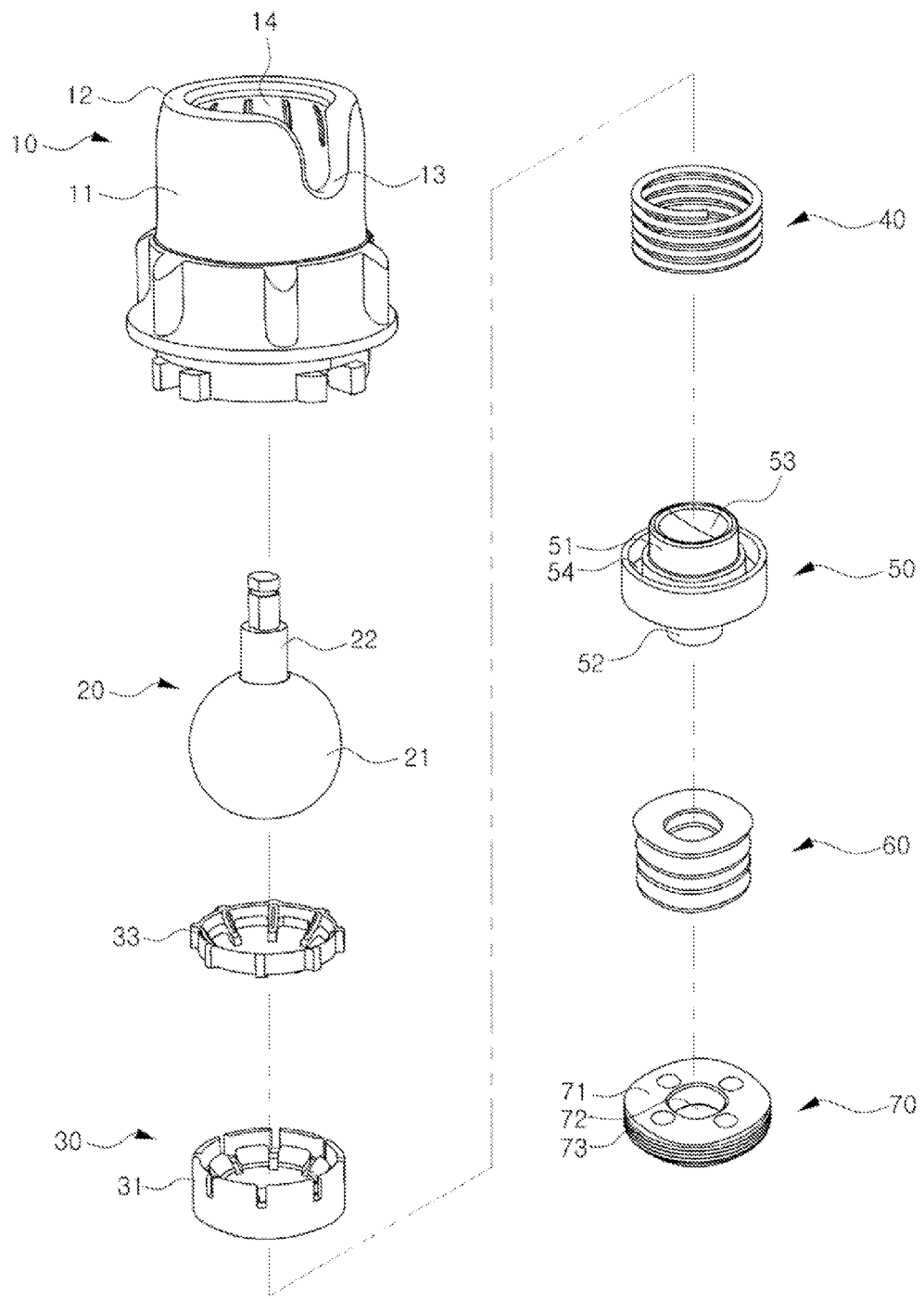
FIG. 3 is an exploded perspective view illustrating the ball hinge structure of the present invention.

Hereinbelow, configurations and operations of the present invention will be described in detail with reference to the accompanying drawings. The terminologies or words used in the description and the claims of the present invention should be interpreted based on the meanings and concepts of the invention in keeping with the scope of the invention based on the principle that the inventor(s) can appropriately define the terms in order to describe the invention in the best way.

A ball hinge structure according to the present invention includes: a hinge housing 10; a ball hinge 20; a first hinge resistor 50; a first spring 60; a second hinge resistor 30; a second spring 40; and a hinge housing cap 70, wherein the first hinge resistor 50 and the second hinge resistor 30 are elastically supported with respect to each other by the second spring 40, and the first hinge resistor 50 is elastically supported by the first spring 60, and wherein a level in which the top surface of the first hinge resistor 50 is pushed by a groove 23 formed in the bottom of the ball hinge 20 is changed according to rotation of the ball hinge 20.

The ball hinge 20 is rotatably installed inside the hinge housing 10, and the first hinge resistor 50 and the second hinge resistor 30 are elastically supported with respect to each other by the second spring 40.

As an arc portion 14 is formed in an inner side of a top portion 12 of a hollow circular pipe 11, the hinge housing 10 prevents a sphere 21 of the ball hinge 20 from being separated upward upon its rotation. Furthermore, a groove 13 is formed in a side of the pipe 11 of the hinge housing 10 so that a connecting rod 22 of the ball hinge 20 can be inserted into the groove 13, thereby enabling the ball hinge to be rotatable horizontally.

A protrusion 15 is formed in the arc portion 14 of the hinge housing 10 so that the sphere 21 of the ball hinge 20 can be easily rotated.

The bottom of the hinge house 10 is fixed to a lower structure body targeted to apply the hinge structure, and the connecting rod 22 is fixed to an upper structure body. Here, the lower structure body means a lower support, and the upper structure body means an upper support, but they are not limited to the supports.

The second hinge resistor 30 is closely attached on the circumference at a side of the sphere 21 of the ball hinge 20 and functions to control rotation or slipping of the ball hinge 20 thanks to a frictional force and an elastic force.

The first hinge resister 50 is elastically supported by the first spring 60 installed on a top surface of the hinge housing cap 70 connected to a lower part of the hinge housing 10. A nut 16 is formed in the bottom of an inner diameter of the hinge housing 10 and is coupled to a bolt 73 formed at an outer diameter of a disk body 71 of the hinge housing cap 70. A hole 72 is formed in the center of the disk body 71 of the hinge housing cap 70 so that a support 52 protruding in the lower center of a body 51 of the first hinge resistor 50 can be inserted into the hole 72.

The support 52 is vertically movable along the hole 72 according to a change in elastic force while the bottom of the first spring 60 is supported by the top surface of the hinge housing cap 70.

The top surface 53 of the first hinge resistor 50 is formed in nearly a plane as illustrated in the drawing while the center thereof has a gentle arc shape. An edge of the top surface 53 has the same curvature as that of the sphere 21 of the ball hinge 20 and is in contact with the sphere 21 at an initial state thereof.

When the groove 23 formed in the bottom of the sphere 21 is placed on the top surface 53 with the connecting rod 22 of the ball hinge 20 positioned vertically relative to the top surface 53, the first hinge resister 50 is located at the uppermost position, and when the connecting rod 22 is positioned horizontally relative to the top surface 53, the first hinge resistor 50 is located at the lowermost position so that the compression force acting on the first spring 60 can be changed.

That is, since the sphere 21 is cut and removed as much as a size resulting from formation of the groove 23 from its original circular shape, a diameter of the sphere 21 on the basis of the groove 23 is reduced compared to the original sphere diameter. Accordingly, the first hinge resistor 50 which is elastically in contact with the sphere 21 is lifted up to the uppermost position. In this state, since a distance between the second hinge resistor 30 and the first hinge resistor 50 becomes narrow, elasticity of the second spring 40 which is a compression spring is strong, thereby holding the sphere 21 of the ball hinge 20.

Figure 4:
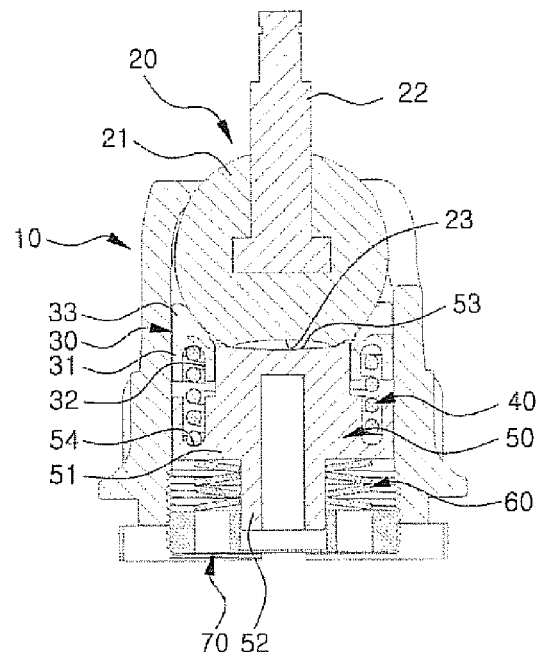
FIGS. 4 to 8 are cross-sectional views illustrating operation steps of the ball hinge structure of the present invention.

This is illustrated in FIG. 4, a disc spring which is the first spring 60 supports the first hinge resistor 50 with a minimum torque value, and the second hinge resistor 30 supports the ball hinge 20 with a strong compression force.

The groove 23 is formed in the bottom of the ball hinge 20, and thus when the connecting rod 22 is in an initial position, namely, in a vertical state, the first hinge resistor 50 is lifted in a position as high as that of the groove 23 in the full sphere, so a weak compression force is applied to the first spring when the first hinge resistor 50 is elastically supported by the ball hinge 20.

When the ball hinge 20 is tilted, the sphere 21 outside the groove 23 pushes the first hinge resistor 50 according to a tilted angle thereof, thereby applying a strong compression force to the first spring 60.

A groove 54 is formed in a circumference of the first hinge resistor 50 so that a lower portion of the second spring 40 which is a compression spring can be inserted, and a groove 32 is entirely formed along the bottom of a ring-shaped body 31 of the second hinge resistor 30 so that an upper portion of the second spring 40 can be inserted into the groove.

An urethane contact portion 33 which is closely attached to the sphere 21 of the ball hinge 20 is formed in an upper portion of the second hinge resistor 30, and the support 52 protrudes in a cylindrical shape in the center of the bottom of the first hinge resistor 50 and is supported to be vertically movable through the hole 72 formed in the center of the hinge housing cap 70.

Figure 5:
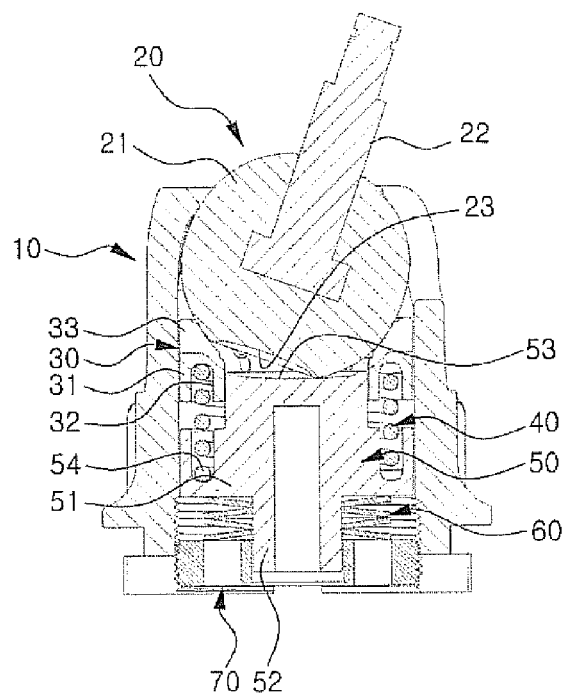
Figure 6:
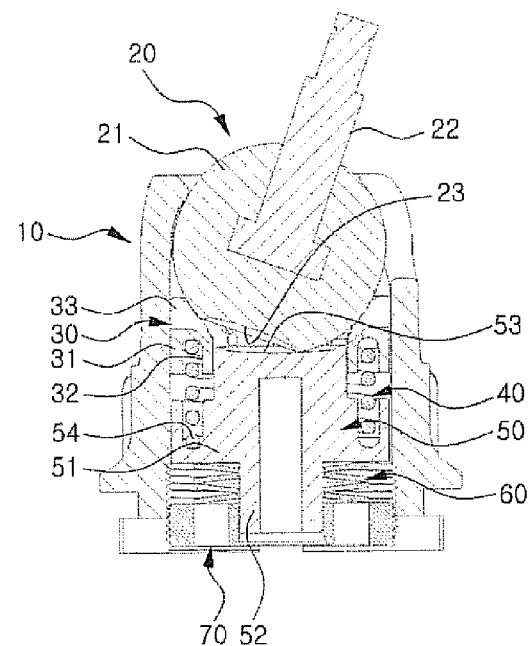

FIGS. 5 and 6 illustrate a state in which the ball hinge 20 starts to be titled, and as the ball hinge 20 is titled, a protruding portion which is the edge of the groove 23 pushes the first hinge resistor 50 downward. At this time, the first hinge resistor 50 compresses the first spring 60 so that a compression force can occur at a contact portion of the ball hinge 20 which is in contact with the first hinge resistor 50.

Also, at this time, the first hinge resistor 50 is lifted up to the uppermost position, and thus a distance between the first hinge resistor 50 and the second hinge resistor 30 in contact with the ball hinge 20 becomes smallest, whereupon the compression force of the second spring 40 which has been strongly compressed is relatively reduced because the first hinge resistor 50 is moved downward, and thus the distance between the first hinge resistor 50 and the second hinge resistor 30 becomes wider.

Accordingly, the load of the ball hinge 20 applied by the second resistor 30 becomes weak, thereby enabling the ball hinge 20 to smoothly move. On the contrary, since a strong elastic force is applied to the first hinge resistor 50, there is an effect that the supporting force is improved in a stop state.

The urethane contact portion 33 of the second hinge resistor 30 which is doubly injected transmits continuous resistivity to the ball hinge 20 so that force momentarily applied to the ball hinge 20 due to self-resistivity resulting from friction can be uniformly maintained.

Figure 7:
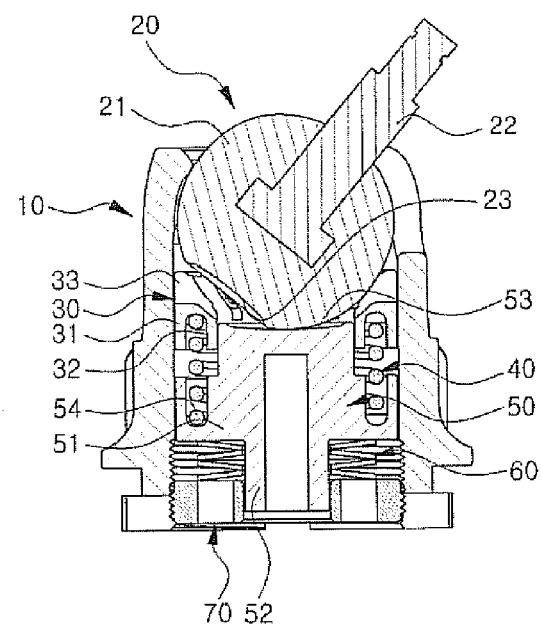
Figure 8:
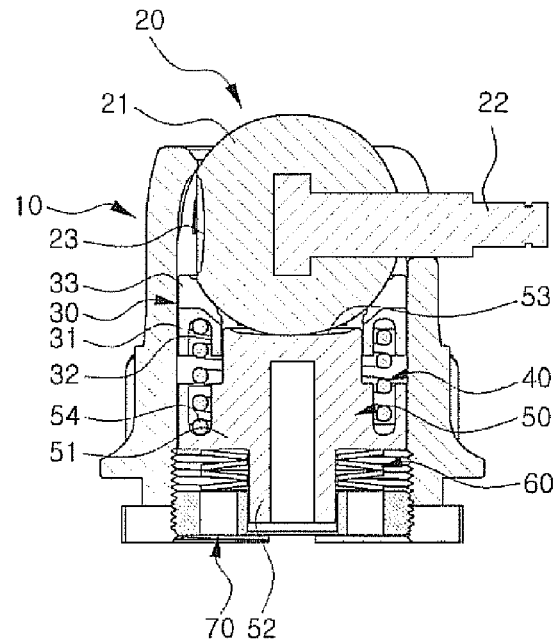

As illustrated in FIGS. 7 and 8, when the ball hinge 20 is further titled, the protruding portion of the edge of the groove 23 passes along the top surface 53 of the first hinge resistor 50, and the first hinge resistor 50 is reduced in a pushing force toward the lower side. At this time, the first hinge resistor 50 is moved upward again, and the second spring 40 holds the ball hinge 20 while being compressed again.

As such, the ball hinge structure is characterized in that a compression force opposite the compression force of the first hinge resistor 50 is applied to the second hinge resistor 30, so the fixing force of the ball hinge can be changed according to the position of the ball hinge.

Figure 9:
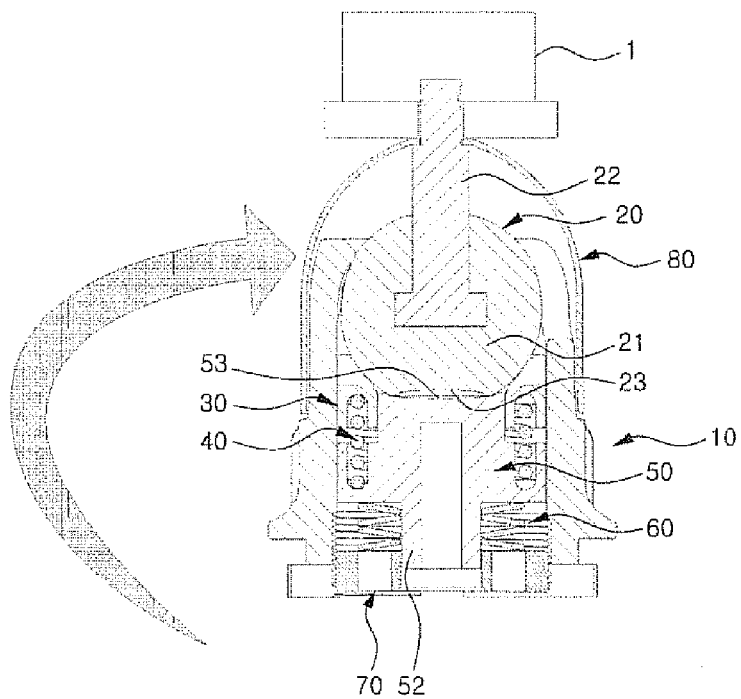
FIGS. 9 and 10 are cross-sectional views illustrating a state in which a bellows is installed in the ball hinge structure.
Figure 10:
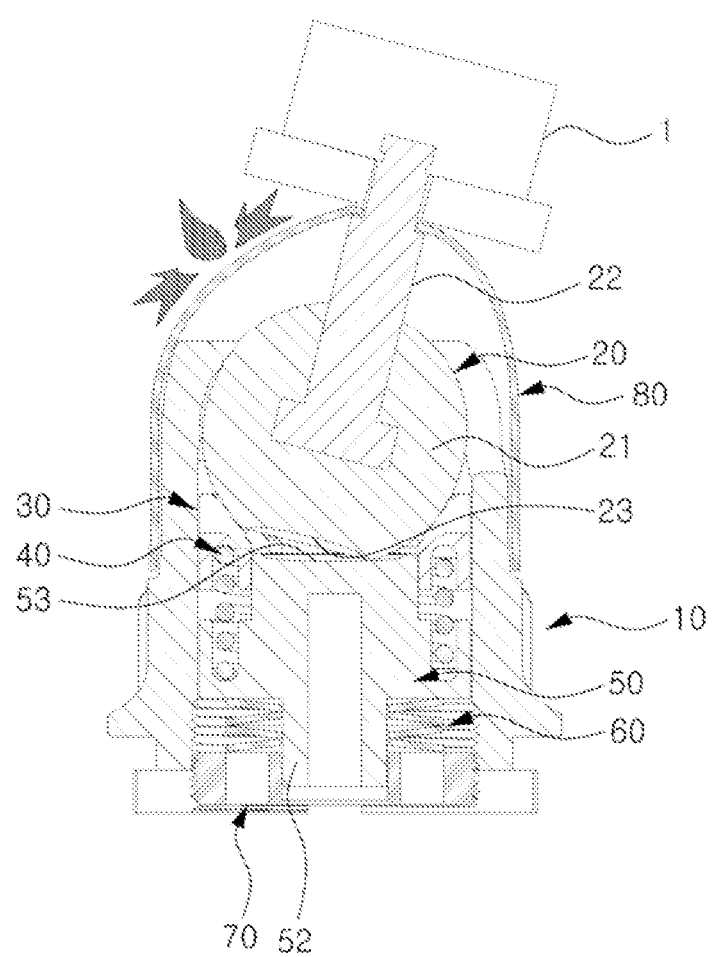

As illustrated in FIGS. 9 and 10, a bellows 80 is installed to entirely cover both a side of the connecting rod 22 of the ball hinge 20 and an outer surface of the hinge housing 10 so as to fundamentally prevent the hinge structure from malfunctioning because pollutants such as water, oil, dust, and the like enter the hinge structure. The bellows 80 is a rubber product having elasticity, but may have a flexible form.

| | |
|---|---|
| *10: Hinge housing | 11: Pipe |
| 12: Top portion | 13: Groove |
| 14: Arc portion | 15: Protrusion |
| 16: Nut | 20: Ball hinge |
| 21: Sphere | 22: Connecting rod |
| 23: Groove | 30: Second hinge resistor |
| 31: Ring-shaped body | 32: Groove |
| 33: Urethane contact portion | 40: Second spring |
| 50: First hinge resistor | 51: Body |
| 52: Support | 53: Top surface |
| 54: Groove | 60: First spring |
| 70: Hinge housing cap | 71: Disk body |
| 72: Hole | 73: Bolt part |
| 80: Bellows | 52: Support |

The invention claimed is:

1. A ball hinge structure, comprising:
a ball hinge rotatably installed inside a hinge housing; and
a first hinge resistor and a second hinge resistor elastically supported with respect to each other by a second spring,
wherein the second hinge resistor is in contact with a circumference of the ball hinge,
the first hinge resistor is elastically supported by a first spring provided on a top surface of a hinge housing cap coupled to a lower portion of the hinge housing,
the ball hinge includes a groove, and when the ball hinge is maintained in a normal position thereof, the first hinge resistor is faced with the groove having a smaller circumference than a circumference having a radius of the ball hinge to apply a weak compression force to the first spring elastically supporting the first hinge resistor, and when the ball hinge is tilted, the circumference of the ball hinge having the radius pushes the first hinge resistor according to a tilted angle thereof, thereby applying a strong compression force to the first spring, and a compression force opposite to the compression force of the first hinge resistor is applied to the second hinge resistor, so a fixing force of the ball hinge changes according to the position of the ball hinge.

2. The ball hinge structure of claim 1, wherein a protrusion is formed in an arc portion of the hinge housing so that the ball hinge is easily rotated.

3. The ball hinge structure of claim 2, wherein a groove is formed in a circumference of the first hinge resistor so that a lower part of the second spring that is a compression spring is inserted, a groove is entirely formed along the bottom of a ring-shaped body of the second hinge resistor so that an upper part of the second spring is inserted into the groove, an urethane contact portion is formed in an upper portion of the second hinge resistor so as to come into close contact with the sphere of the ball hinge, and a support protrudes in a cylindrical shape in the center of the bottom of the first hinge resistor and is supported to be vertically movable through a hole formed in the center of the hinge housing cap.

4. The ball hinge structure of claim 1, wherein the center of a top surface of the first hinge resistor has a gentle arc shape, and an edge of the top surface has the same curvature as that of the sphere of the ball hinge, so that, when the groove formed in a bottom of the ball hinge is placed on the top surface of the first hinge resistor and a connecting rod of the ball hinge is positioned vertically relative to the top surface of the first hinge resistor, the first hinge resister is located at the uppermost position, and when the connecting rod is positioned horizontally relative to the top surface of the first hinge resistor, the first hinge resistor is located at the lowermost position so that the compression force acting on the first spring changes.

5. The ball hinge structure of claim 4, wherein a groove is formed in a circumference of the first hinge resistor so that a lower part of the second spring that is a compression spring is inserted, a groove is entirely formed along the bottom of a ring-shaped body of the second hinge resistor so that an upper part of the second spring is inserted into the groove, an urethane contact portion is formed in an upper portion of the second hinge resistor so as to come into close contact with the sphere of the ball hinge, and a support protrudes in a cylindrical shape in the center of the bottom of the first hinge resistor and is supported to be vertically movable through a hole formed in the center of the hinge housing cap.

6. The ball hinge structure of claim 1, wherein a groove is formed in a circumference of the first hinge resistor so that a lower part of the second spring that is a compression spring is inserted, a groove is entirely formed along the bottom of a ring-shaped body of the second hinge resistor so that an upper part of the second spring is inserted into the groove, an urethane contact portion is formed in an upper portion of the second hinge resistor so as to come into close contact with the sphere of the ball hinge, and a support protrudes in a cylindrical shape in the center of the bottom of the first hinge resistor and is supported to be vertically movable through a hole formed in the center of the hinge housing cap.

7. The ball hinge structure of claim 1, wherein a bellows is installed to entirely cover both a side of a connecting rod of the ball hinge and an outer surface of the hinge housing.

* * * * *